(12) United States Patent
Nilsen

(10) Patent No.: US 10,459,656 B1
(45) Date of Patent: Oct. 29, 2019

(54) METHOD AND APPARATUS TO REPRESENT ACTIVATION FRAME FOR PAUSE-LESS GARBAGE COLLECTION

(71) Applicant: International Business Machines Corporation, Armonk, NY (US)

(72) Inventor: Kelvin D. Nilsen, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/017,107

(22) Filed: Jun. 25, 2018

(51) Int. Cl.
  *G06F 12/00* (2006.01)
  *G06F 3/06* (2006.01)
  *G06F 12/02* (2006.01)

(52) U.S. Cl.
  CPC .......... *G06F 3/0652* (2013.01); *G06F 3/0608* (2013.01); *G06F 3/0673* (2013.01); *G06F 12/0253* (2013.01)

(58) Field of Classification Search
  CPC .... G06F 3/0652; G06F 3/0608; G06F 3/0673; G06F 12/0253; G06F 12/0261; G06F 12/0269; G06F 12/0276
  See application file for complete search history.

(56) References Cited

U.S. PATENT DOCUMENTS

| | | | |
|---|---|---|---|
| 5,873,105 A | 2/1999 | Tremblay et al. | |
| 6,249,793 B1 | 6/2001 | Printezis et al. | |
| 6,381,738 B1 | 4/2002 | Choi et al. | |
| 6,484,188 B1 | 11/2002 | Kwong et al. | |
| 7,548,940 B2 | 6/2009 | Bacon et al. | |
| 7,831,961 B1 | 11/2010 | Bush et al. | |
| 8,126,941 B2 | 2/2012 | Inoue | |
| 2010/0114998 A1* | 5/2010 | Steensgaard | G06F 12/0269 707/813 |

OTHER PUBLICATIONS

Bacon et al., "A Real-time Garbage Collector with Low Overhead and Consistent Utilization," ACM SIGPLAN Notices 38, No. 1., Jan. 15-17, 2013, pp. 1-14.

* cited by examiner

*Primary Examiner* — Shawn X Gu
(74) *Attorney, Agent, or Firm* — Cantor Colburn LLP; Noah Sharkan (57) ABSTRACT

According to one or more embodiments described herein, a method for pause-less garbage collection includes selecting, by a garbage collector, for garbage collection, a process thread that is executing a process. The method further includes causing a first activation frame that is associated with a first method to be scanned, either by a garbage collector thread or by the process thread that is presently executing. The method further includes instructing the process thread to subsequently scan a second pause-less activation frame that is associated with a second method from a process that the process thread is presently executing. The method further includes scanning using a garbage collector thread, a third pause-less activation frame that is associated with a third method from the process, wherein scanning a pause-less activation frame includes examining and overwriting one or more live pointers from a method corresponding to said pause-less activation frame being scanned.

20 Claims, 7 Drawing Sheets

METHOD AND APPARATUS TO REPRESENT ACTIVATION FRAME FOR PAUSE-LESS GARBAGE COLLECTION

BACKGROUND

The present application generally relates to the field of computer memory management and particularly to garbage collection process for high-performance time critical applications.

With regard to computers, garbage collection refers to a process of identifying unused areas of main memory storage. In accordance with an object oriented computing language, the computer executing the program allocates memory for each of the objects. Memory is allocated to, and freed from, the heap in blocks that are sized according to application requirements. Eventually, when the objects are no longer being referenced by the program, the memory allocated for the created objects is reclaimed through a garbage collection process. The garbage collection process clears the objects from memory whereby the once allocated memory is again available for use. More particularly, a garbage collection process may involve automatically determining which blocks of memory can be freed by marking objects that are in use and reclaiming the memory of objects that are not marked. Such a garbage collection process is often referred to as a mark-and-sweep since useful portions of memory are marked as live during a mark phase, and all unmarked objects are then removed from allocated memory in a sweep phase. Although the process of garbage collection frees memory, it may be problematic in applications where its unpredictable consumption of processor time affects the running of the application.

SUMMARY

According to one or more embodiments described herein, a method for pause-less garbage collection includes selecting, by a garbage collector, for garbage collection, a process thread that is executing a process. The method further includes causing a first activation frame that is associated with a first method to be scanned, either by a garbage collector thread or by the process thread that is presently executing. The method further includes instructing the process thread to subsequently scan a second pause-less activation frame that is associated with a second method from a process that the process thread is presently executing. The method further includes scanning using a garbage collector thread, a third pause-less activation frame that is associated with a third method from the process, wherein scanning a pause-less activation frame includes examining and overwriting one or more live pointers from a method corresponding to said pause-less activation frame being scanned.

According to one or more embodiments of the present invention a system includes a memory, and a processor coupled with the memory. The processor performs a pause-less garbage collection that includes selecting, by a garbage collector, for garbage collection, a process thread that is executing a process. The pause-less garbage collection further includes causing a first activation frame that is associated with a first method to be scanned, either by a garbage collector thread or by the process thread that is presently executing. The pause-less garbage collection further includes instructing the process thread to subsequently scan a second pause-less activation frame that is associated with a second method from a process that the process thread is presently executing. The pause-less garbage collection further includes scanning, by the garbage collector, using a garbage collector thread, a third pause-less activation frame that is associated with a third method from the process, wherein scanning a pause-less activation frame includes examining and overwriting one or more live pointers from a method corresponding to said pause-less activation frame being scanned.

According to one or more embodiments of the present invention a computer program product includes a computer readable storage medium having program instructions embodied therewith. The program instructions executable by an electronic computer processor to perform a pause-less garbage collection that includes selecting, by a garbage collector, for garbage collection, a process thread that is executing a process. The pause-less garbage collection further includes causing a first activation frame that is associated with a first method to be scanned, either by a garbage collector thread or by the process thread that is presently executing. The pause-less garbage collection further includes instructing the process thread to subsequently scan a second pause-less activation frame that is associated with a second method from a process that the process thread is presently executing. The pause-less garbage collection further includes scanning, by the garbage collector, using a garbage collector thread, a third pause-less activation frame that is associated with a third method from the process, wherein scanning a pause-less activation frame includes examining and overwriting one or more live pointers from a method corresponding to said pause-less activation frame being scanned.

It is to be understood that the technical solutions are not limited in application to the details of construction and to the arrangements of the components set forth in the following description or illustrated in the drawings. The technical solutions are capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods, and systems for carrying out the several purposes of the presently described technical solutions.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
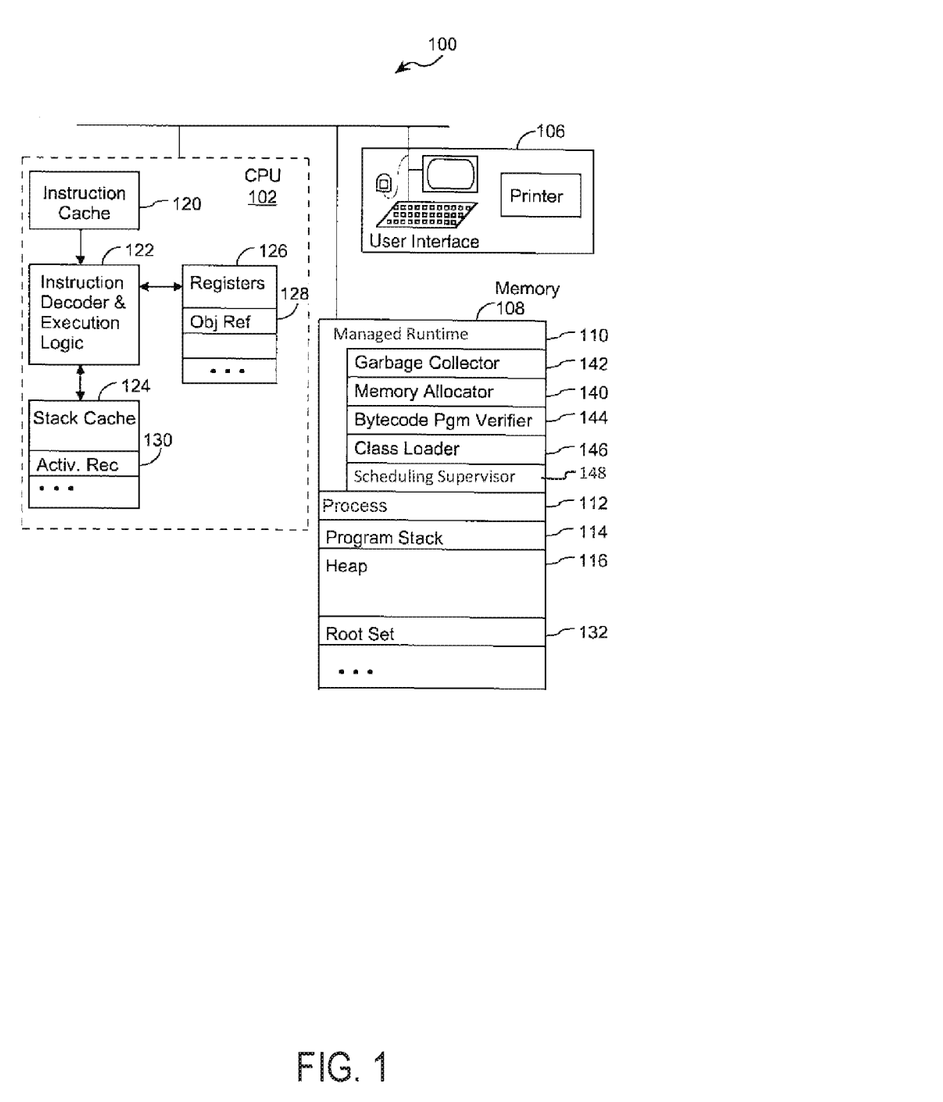
FIG. 1 illustrates an example multitasking computer system.

Referring to FIG. 1, there is shown a typical multitasking computer system 100 that has a CPU 102, user interface 106, and memory 108, which includes a random access memory (RAM) and non-volatile memory for storage. The memory 108 stores a managed run-time environment 110 and one or more processes 112, each of which may include one or more threads. Each active process in the system is assigned a portion of the computer's memory, including space for storing the application level code 112 executed by the process, a heap 116 that is used for dynamic memory allocation, space for representing the state of each thread that is executing the process, and space for storing each thread's program stack 114. The managed run-time environment 110 further includes a scheduling supervisor 148, which takes responsibility for deciding which of the multiple tasks being executed to dedicate CPU time to. Typically, the scheduling supervisor 148 has to weigh tradeoffs between running application process threads and running garbage collection threads. Further, within the managed run-time environment 110, multiple independently developed applications may run concurrently.

Each thread's program stack 114 may not be in contiguous pages of memory 108, and if not contiguous, the pages or possibly larger contiguous chunks of stack storage are linked together using known techniques. It should be noted that within the process 112, there are multiple threads, and each thread has its own program stack 114.

The CPU 102 includes an instruction cache 120 for providing instructions to an instruction decoder and execution logic 122. The CPU 102 also includes a stack cache 124 for storing in high speed cache memory a portion of the program stack 114, and a set of registers 126 for storing data values, object references 128 and the like. The program stack 114, including the portion in the stack cache 124, is used to temporarily store various data structures and parameters, including activation frames 130 (or records) that are pushed on the program stack 114 each time a method or other procedure is invoked.

At the start of certain garbage collection phases, the garbage collector scans the root set of pointers 132. It should be noted that, although FIG. 1 depicts a root set 132 as a single block, the root set 132 includes machine registers and certain global memory locations, and the root set can be encoded in the garbage collector as part of the computer executable instructions responsible for scanning of the root set. The root set represents a finitely bounded number of machine registers and memory locations, the accumulation of which provide indirect access to all objects that are currently in use by the process 112. In a pause-less garbage collection system, the number of variables in the root set 132 is very small, typically fewer than 100. The root set does not include the contents of individual thread stacks or the contents of all thread descriptions. Rather, the root set typically includes a reference to a data structure which keeps track of all thread descriptions. Each thread description in turn keeps track of an associated thread stack.

It should be understood that FIG. 1 depicts only a simplified representation of a CPU 102 and the items stored in memory. Also, it should be understood that multiple processes may be executing simultaneously in a computer system, each with its own address space that includes the same types of items as shown in the memory 108 of FIG. 1.

The term "object" is herein defined to mean any data structure created by a program or process. The terms "reference" and "object reference" are used interchangeably to describe a data structure that includes a pointer to an object. While the term "pointer" or "object pointer" are sometimes used interchangeably with "reference" and "object reference", object references may include information in addition to a pointer. An object reference may be direct or indirect. A direct object reference directly points to an object header, while an indirect object reference points to an object handle. As used herein, the term "object reference" refers to both types.

When the process 112 associated with the heap 116 needs space for storing an array or other program "object", a memory allocator routine 140 is called/invoked. The memory allocator 140 responds by allocating a block of unused memory in the heap 116 to the process 112. Additional requests for memory result in the allocation of additional memory blocks. If the process 112 continues to ask for more memory, all the space in the heap 116 will eventually be used and the process 112 can fail for lack of memory. Therefore space must be replenished by either explicit actions of the program or some other mechanism.

Typically, the process 112 "abandons" much of the memory space that is allocated to its objects. Typically, the process 112 stores references to program objects in allocated memory blocks, and overwrites all references to certain objects after it has finished processing them because it will never need to access those objects again. An object for which there are no references (sometimes called pointers) is often termed an "inaccessible object" or "garbage", and the memory space it occupies is "inaccessible" to the process 112 that once used it.

This technical problem is addressed by recovering blocks of memory space in the heap 116 that are no longer being used by the process 112. Garbage collection is the term used to refer to automatic methods of recovering unused memory in the heap 116. A garbage collector 142 is used to recover unused or abandoned portions of memory in the heap 116 so that the process 112 using the heap will not run out of memory. The programming language's managed run-time environment includes a garbage collector 142. The garbage collector 142 gathers and recovers unused memory upon the occurrence of a predefined event, such as the expiration of a predefined time period, or usage of a certain amount of the available heap.

The garbage collector 142 can use any of the different garbage collection methodologies, such as the stop-and-copy garbage collection technique. In this scheme, the heap 116 is divided into two halves, also called semi-spaces, and the program uses only one semi-space at a time. Stop-and-copy garbage collectors reclaim unused memory and compact the program accessible memory used by a process 112 by copying all "accessible objects" in the old semi-space (typically identified as from-space) to a contiguous block of memory in the other semi-space (typically known as to-space), and changing all references to the accessible objects so as to point to the new copy of these objects. An accessible object is any object (i.e., a block of memory) that is referenced, directly or indirectly, by the "roots" or "root set" of the task. Typically, the root set 132 of a process 112 with respect to garbage collection is a set of object references stored in known locations such as certain machine registers 126 and certain global variables, which point to objects used by a process 112. Many of those objects, in turn, will contain references to other objects used by the process 112. The chain, or directed graph, of object references emanating from the root set indirectly points to all of the accessible objects in the heap 116.

By copying all accessible objects to a new contiguous block of memory in the heap 116, and then using the new copy of the objects in place of the old copy, the stop-and-copy garbage collector 142 eliminates all unused memory blocks in the heap 116. It also "compacts" the memory storage used by the task so that there are no "holes" between accessible objects. Compaction is a desirable property because it puts all of the memory available for allocation to a task in a contiguous block, which eliminates the need to keep track of numerous small blocks of unallocated memory. Compaction also improves virtual memory performance.

It should be noted that although stop-and-copy garbage collection is described herein, the technical solutions described herein are applicable even if the garbage collector 142 uses any other technique such as an incremental garbage collection or any garbage collection system that must scan the contents of each thread stack in order to identify in-use objects, and to any tracing garbage collection system that needs to quickly and efficiently locate object references made from within thread activation records. It should be noted that stop-and-copy garbage collection is not suitable for pause-less garbage collection because this technique introduces very long pauses (ranging from hundreds of ms to tens of seconds) while the application is stopped during copying. Incremental mark-and-sweep and incremental copying techniques are more suitable for pause-less garbage collection.

Also shown in FIG. 1 are aspects of a computer system that is set up to execute JAVA™ bytecode programs. In particular, the managed run-time environment 110 of such a system includes a bytecode program verifier 144 for verifying whether or not a specified Java bytecode program satisfies certain predefined integrity criteria. The managed run-time environment 110 also includes a class loader 146, which loads object classes into the heap and utilizes the bytecode program verifier 144 to verify the integrity of the methods associated with each loaded object class. In one or more examples, the managed run-time environment 110 also includes a bytecode program interpreter (not shown) for executing Java bytecode programs. If the instruction decoder and execution logic 122 is designed to execute Java bytecode instructions, a bytecode program interpreter is not needed.

Time-critical Java software has been successfully deployed in a breadth of domains, including control over manufacturing automation, electric power management, autonomous vehicles, telecommunication infrastructure, and weapons systems. These successfully deployed applications demonstrate that the high-level benefits of Java can be made available to and are valued by time-critical developers, even though real-time applications implemented in Java have required more CPU and memory resources than the same applications implemented in C. Java is most suitable for large and complex time-critical applications that are not deployed in high (consumer electronics) volumes. With these applications, the costs and risks associated with development and maintenance of software are typically far greater than the total costs of the computing hardware on which the software is deployed. These are the sorts of applications that appreciate that Java developers are often twice as productive during the implementation of new functionality and over ten times as productive during reuse, maintenance, and repurposing of existing functionality in comparison with legacy approaches based on C or C++.

Two technical impediments to adoption of time-critical Java technologies have been that (1) time-critical Java virtual machines run much slower than traditional Java virtual machines due to the overhead of fine-grained coordination between application threads 112 and garbage collection 142 activities, and (2) the response latency of traditional Java threads 112 is approximately 200 µs even on the most responsive of real-time Java virtual machines. This is roughly 20 times slower than the typical response latency of similar threads written in C. The technical solutions described herein address such technical challenges, enabling throughput comparable to traditional Java and response latency comparable to applications written in C. The technical solutions described herein thus address technical challenges rooted in computing technology of performance of Java programs and improve the execution of Java programs by facilitating a pause-less garbage collection for high performance time-critical Java programs. It should be noted that although the examples described herein use Java programs, the technical solutions described herein are applicable to computer programs written using any other computer programming language or a combination thereof, particularly if the language(s) uses garbage collection for memory management.

Figure 5:
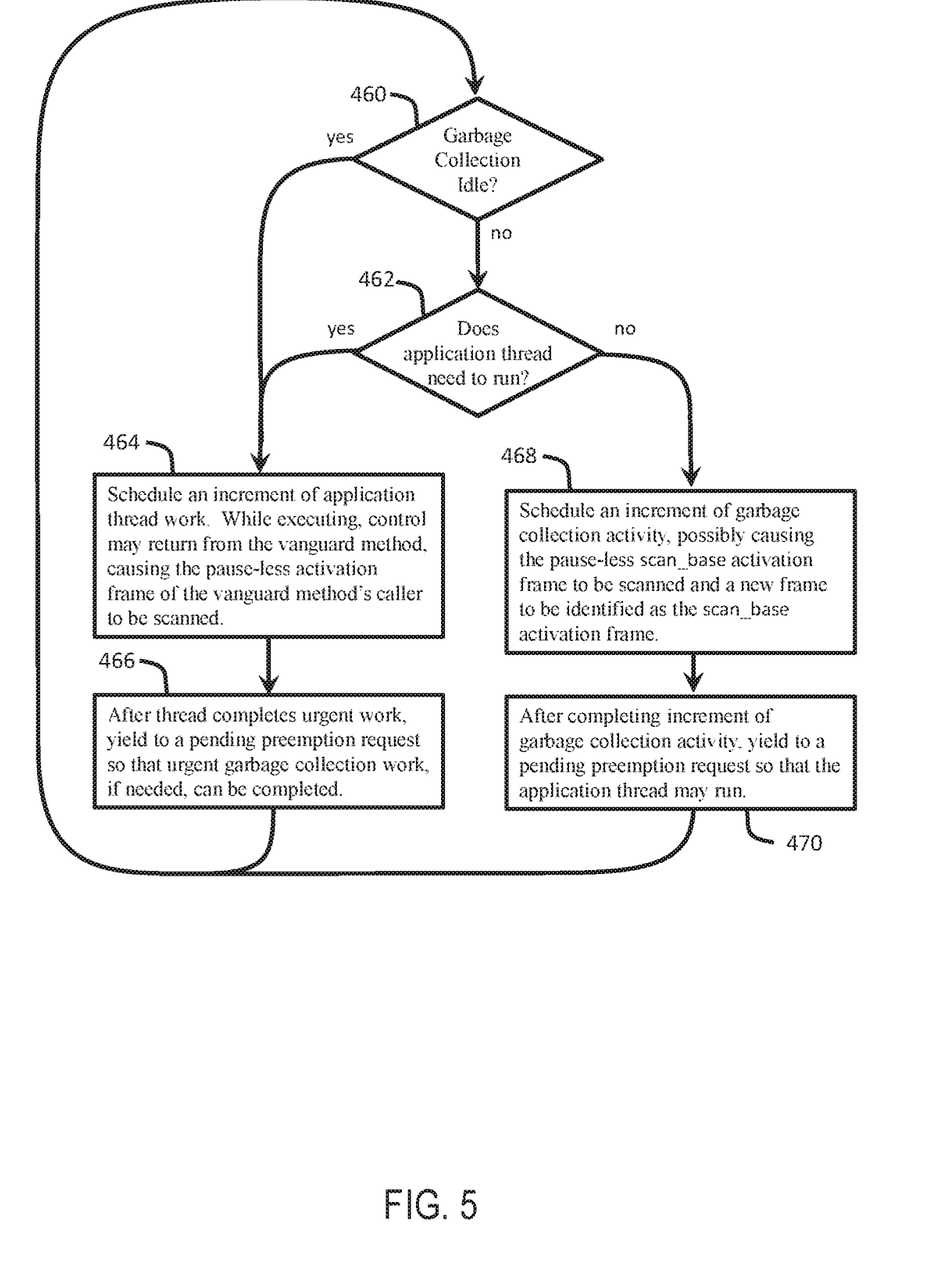
FIG. 5 illustrates a flowchart of an example method for coordinating scanning of a thread stack by an application thread and a garbage collection thread.

The total garbage collection effort of a pause-less garbage collection system described herein is divided into small increments of work which are interleaved with execution of application code being executed by the process 112. To assure reliable operation, each increment of garbage collection and application effort make measurable forward progress, as illustrated in FIG. 5. Further, because Java objects are shared between application and garbage collection threads, the pause-less garbage collection uses a protocol to assure data coherency. Whenever the garbage collector 142 relocates an object in order to defragment memory, the process 112 promptly becomes aware of the object's new location in memory 108. Likewise, whenever an application thread i.e. the process 112, overwrites a pointer field of an existing object or overwrites a pointer contained within the activation frame of the currently executing method, the garbage collector 142 promptly recognizes this change in the object connectivity graph as this may change the garbage collector's 142 perception of "garbage" i.e. memory that is no longer used by the process 112.

Java application developers use special syntax to mark objects that are being shared between threads. This allows the compiler to optimize access to unshared objects. The contents of unshared objects can be cached in machine registers 126 and access to unshared objects does not need memory barriers to force cache coherency. Java compilers generate very efficient code for threads that are dealing only with private (unshared) objects. No such syntax distinguishes objects that are to be visible to the garbage collector 142. It is the compiler's responsibility, and opportunity, to emit code that assures coherency.

Figure 2:
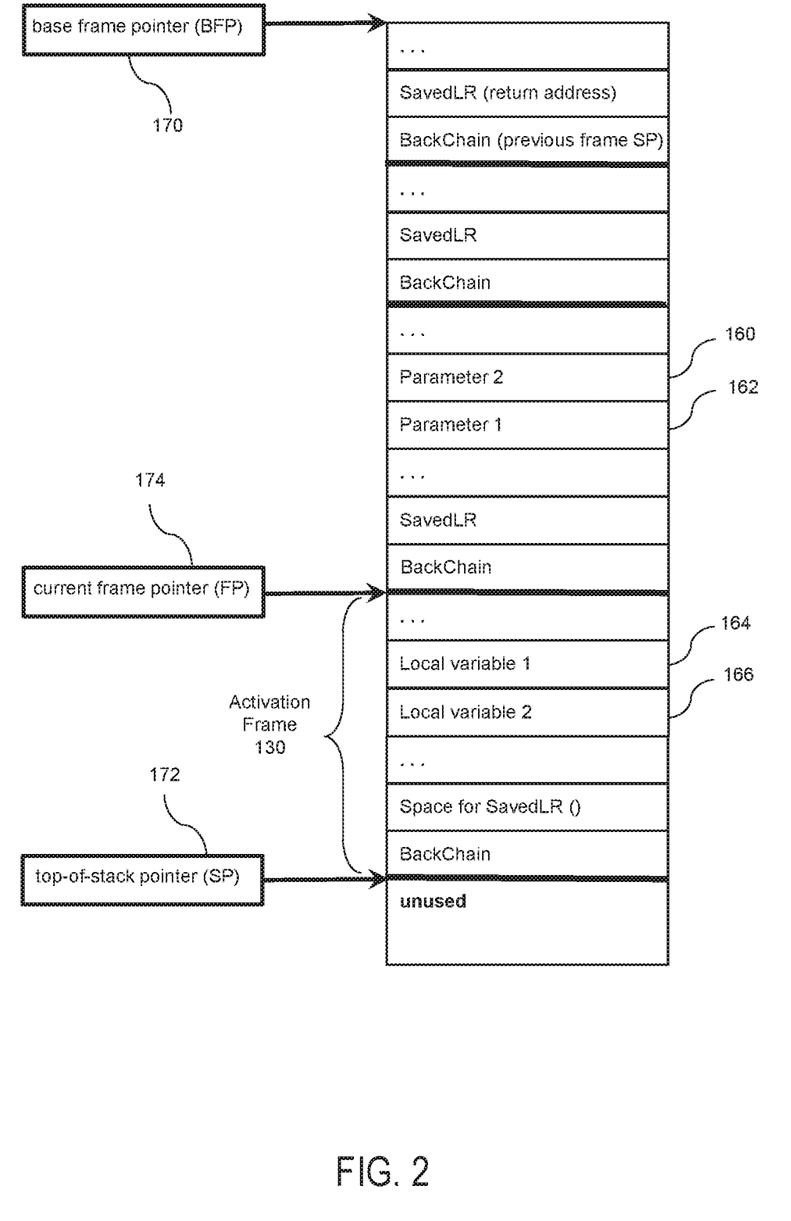
FIG. 2 illustrates a block diagram of a program stack and typical activation frames stored on the program stack.

FIG. 2 is a block diagram of the program stack, and typical activation frames stored on the program stack. The program stack 114 stores both method activation frames (also called stack frames/activation records). Intermediate computational evaluation data is stored within activation frames. Each time a new method or procedure is called, a new stack frame or activation frame 130 is pushed onto the stack 114.

As depicted in FIG. 2, an example activation frame 130 includes, among other elements, a return address program counter value. The activation frame 130 further includes a previous frame stack pointer value (i.e., pointing to the beginning of the preceding stack frame, if any). The activation frame 130 further includes operand parameters 160, 162 associated with the called procedure or method. The activation frame 130 further includes local variables 164, 166 associated with the called procedure or method.

Further yet, a number of registers are used to manage the use of the program stack 114. For example, registers are used to store a base frame pointer 170 that points to the base of the stack 114, a top-of-stack pointer 172 that points to the top of the stack (i.e., the beginning of the unused portion of the stack), and a current frame pointer 174 that points to the end of the current activation frame 130.

In one or more examples, the managed run-time environment 110 includes instructions for storing in the associated thread stack 114 an activation frame 130 for each method invoked by the process 112. Restated, using conventional terminology, an activation frame 130 is pushed onto the program stack 114 each time a method is invoked or a procedure is called. Whenever a procedure exits, the data processor sets its program counter to the return address PC in the current activation frame 130, the current activation frame 130 is popped from the program stack 114 and the previous activation frame becomes the new current frame 174.

Depending on the method being invoked, one or more of the parameters 160, 162 and local variables 164, 166 in the activation frame 130 may be object references. Typically, there are a fixed number of parameters and a fixed number of local variables in the activation frame 130 for each defined method, and there is a fixed, predefined data type for each of the parameters and variables in the activation frame 130. Typical data types include long integer, short integer (16 bit signed integer), single precision floating point, double precision floating point, byte, character, and object reference (sometimes called an object handle).

Figure 3:
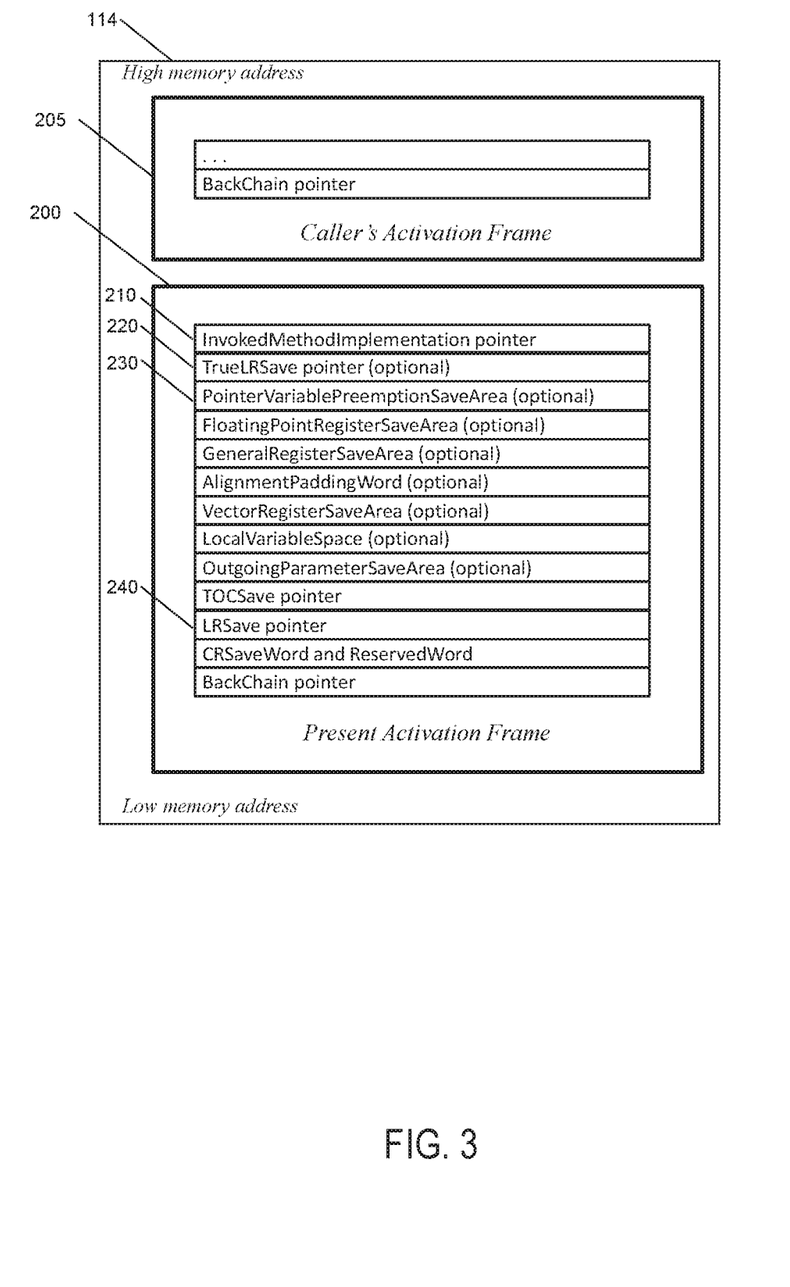
FIG. 3 illustrates a pause-less activation frame for pause-less garbage collection according to one or more examples.

In the pause-less activation frame, a predetermined space is reserved at a fixed offset from the top address of each method's activation frame to hold local pointer values that are shared between the process 112 and the threads executing the garbage collector 142. During most of the time that a method is executing, pointer variables are held in machine registers. Prior to preempting a running thread, all live pointer variables are saved in the PointerVariablePreemptionSaveArea 230. Following preemption, the contents of pointer registers are restored by reading saved values from the PointerVariablePreemptionSaveArea. Storing and fetching these pointer values is nearly free, as these instructions replace the application binary interface's (ABI) existing instructions to save and restore non-volatile registers surrounding each function call. Preemption-safe points are arranged so that hundreds of instructions at a time (typically representing approximately 1 µs of real time) can be executed without requiring coordination overhead. The maintenance of the PointerVariablePreemptionSaveArea is substantially low-cost, if not free, because the operations performed to maintain it are equivalent to those that are already being performed, and implementing the technical solutions described herein does not add further substantial computational cost.

Most pointer parameters are passed in machine registers and most local pointer variables are likewise held in machine registers. In the case that pointer parameters are passed in memory, the compiler generates code to copy the value of the pointer parameter into a slot of the PointerVariablePreemptionSaveArea before the method yields to a preemption request. In the case that a pointer local variable must be represented in memory, the slot reserved by the compiler for representation of the local variable is always taken from within the PointerVariablePreemptionSaveArea.

FIG. 3 depicts a pause-less activation frame for pause-less garbage collection according to one or more examples. The pause-less activation frame 200 is depicted for executing a Java method. However, it should be noted that the pause-less activation frame 200 can be applied to any other computer programming language that uses garbage collection. The pause-less activation frame 200 includes, apart from the typical elements described with reference to FIG. 2, an object reference 210 to a next method that is invoked by the present method associated with the present pause-less activation frame 200. Further, in one or more examples, the pause-less activation frame 200 includes a true return address field (TrueLRSave) 220 representing the context from which the method associated with the present activation frame 200 was invoked. Further yet, in one or more examples, the present pause-less activation frame 200 includes a reference to a pointer variable preemption save area 230. The true return address 220 and the reference to the preemption save area 230 may not be stored in the present pause-less activation frame 200 if the associated method does not have preemption points.

The pointer variable preemption save area 230 is a collection of memory locations in which all the live pointers from the first method associated with the present pause-less activation frame 200 are stored. In one or more examples, the preemption save area 230 includes a dedicated location for storing a live pointer. The one or more live pointers in the first method can be determined by the compiler (not shown) at the time of code generation.

FIG. 3 also depicts a second pause-less activation frame 205 in the program stack 114. The second pause-less activation frame 205 is associated with a caller (second) method that invoked the method (first method) associated with the present pause-less activation frame 200. The second pause-less activation frame 205 also includes the fields 210, 220, and 230.

When the second method prepares to invoke the first method, it overwrites the InvokedMethodImplementation field 210 of its activation frame 205 with a reference to the MethodImplementation object that provides the symbolic information associated with the first method which is about to be invoked. This symbolic information is used to provide stack trace information embedded into every thrown exception, to support certain security management functions (which allow risky operations to be performed only if the call-chain validates that the code requesting the risky operation can be trusted), and to facilitate symbolic debugging. In a pause-less garbage collection environment, the MethodImplementation object 210 also describes the state of the PointerVariablePreemptionSaveArea 220 at each preemption point. Typical method prologues and epilogues do not access the activation frame's TrueLRSave or PointerVariablePreemptionSaveArea fields 220 and 230.

A code generator or compiler (not shown) assumes that each method invocation may result in preemption by the garbage collector 142. Accordingly, each invocation is treated as a preemption point and is accompanied by the actions described by logic in Table 1.

TABLE 1 for each live pointer variable
  save this pointer variable's value to a dedicated slot within
  the pointer variable preemption save area
Invoke the method
for each pointer variable saved above
  restore the pointer variable's value from its dedicated
  slot within thepointer variable preemption save area Assuming that each pointer variable is held in a volatile register 126, this effort of saving and restoring live pointers is essentially the same effort that is performed in the existing ABIs by other programming languages such as by C code for all caller-saved (volatile) registers 126.

Due to the conventions of this method invocation protocol, the non-volatile (callee saved) registers 126 typically are not allocated to represent pointer variables. That is because these code generation conventions cause each pointer variable to be perceived as dead across every method invocation. With languages that do not use the pause-less activation frame described herein, the values restored into particular pointer variables upon return from a method invocation are the exact same values that were saved prior to the invocation. However, with the pauseless activation frame apparatus, the values restored to pointer variables may be different than what was saved into the pointer variable preemption save area. Restored values may be different than the values originally saved into the preemption save area 230 in the case that the garbage collector 142 relocates a referenced object in order to reduce memory fragmentation. Further yet, the set of pointer variables that are considered to be live and the slots dedicated to the saving of each live pointer variable within the pointer variable preemption save area may differ for each preemption point within the function.

In case the first method needs more preemption points than are represented by its invocations of other methods, the code generator inserts an explicit preemption check into the method's body. The code to implement an explicit preemption check is shown in Table 2. If the garbage collector 142 begins scanning this thread's stack while this thread is preempted, the garbage collector 142 scans the pointer variable preemption save area 230 for the preempted method 434 before this thread is allowed to resume execution 438. The preempted method is known as the vanguard method. The pauseless activation frames for the vanguard method and for any methods invoked directly or indirectly from the vanguard method do not need to be scanned. When control returns from the vanguard method, the application thread automatically scans the pointer variable preemption save area of the enclosing activation frame before executing any of the code that implements the caller of the vanguard method, and the vanguard method's caller becomes the newly identified vanguard method.

TABLE 2 if (preemption of this thread is required) {
  save the LR register to the LRSave field if it's not already there
  for each live pointer variable
    save this pointer variable's value to a dedicated slot within
    the pointer variable preemption save area
  yield to preemption request
  for each pointer variable saved above
    restore the pointer variable's value from its dedicated slot
    within the pointer variable preemption save area
  restore the LR register from the LRSave field if its value
  was saved above
}

Delaying a context switch until the current thread of the process 112 reaches its next explicit preemption point increases response latency but enables increases in efficiency of code that executes between preemption points. Maintaining the pause-less activation frame 200 imposes very little execution overhead on running threads of the process 112 while the garbage collector 142 is idle, typically more than 90% of an application's run time. Maintaining the pause-less activation frame 200 during run time improves responsiveness latency of the process 112 by facilitating the program stack 114 of each thread to be scanned incrementally.

Without loss of generality, assume each application thread is paired with a single garbage collection thread that is dedicated to scanning of the application thread's stack. The paired threads share access to a single hardware thread core such that only one of the two threads is allowed to execute at any particular time. Context switches between the two threads occur only at specified preemption-safe execution points, as predetermined by the compiler for application threads and by the developer of the managed run-time environment for garbage collection threads. Assuring that the garbage collector 142 and the application thread of the process 112 are not scanning the same stack at the same time obviates the need for locking protocols to prevent conflicting access to shared slots of the same activation frame. Alternative many-to-many mappings between application threads and garbage collection threads can be implemented with the use of thread synchronization locks or with an intelligent integrated thread scheduler that carefully avoids scheduling an application thread to run at the same time the associated garbage collection thread is running.

Figure 4:
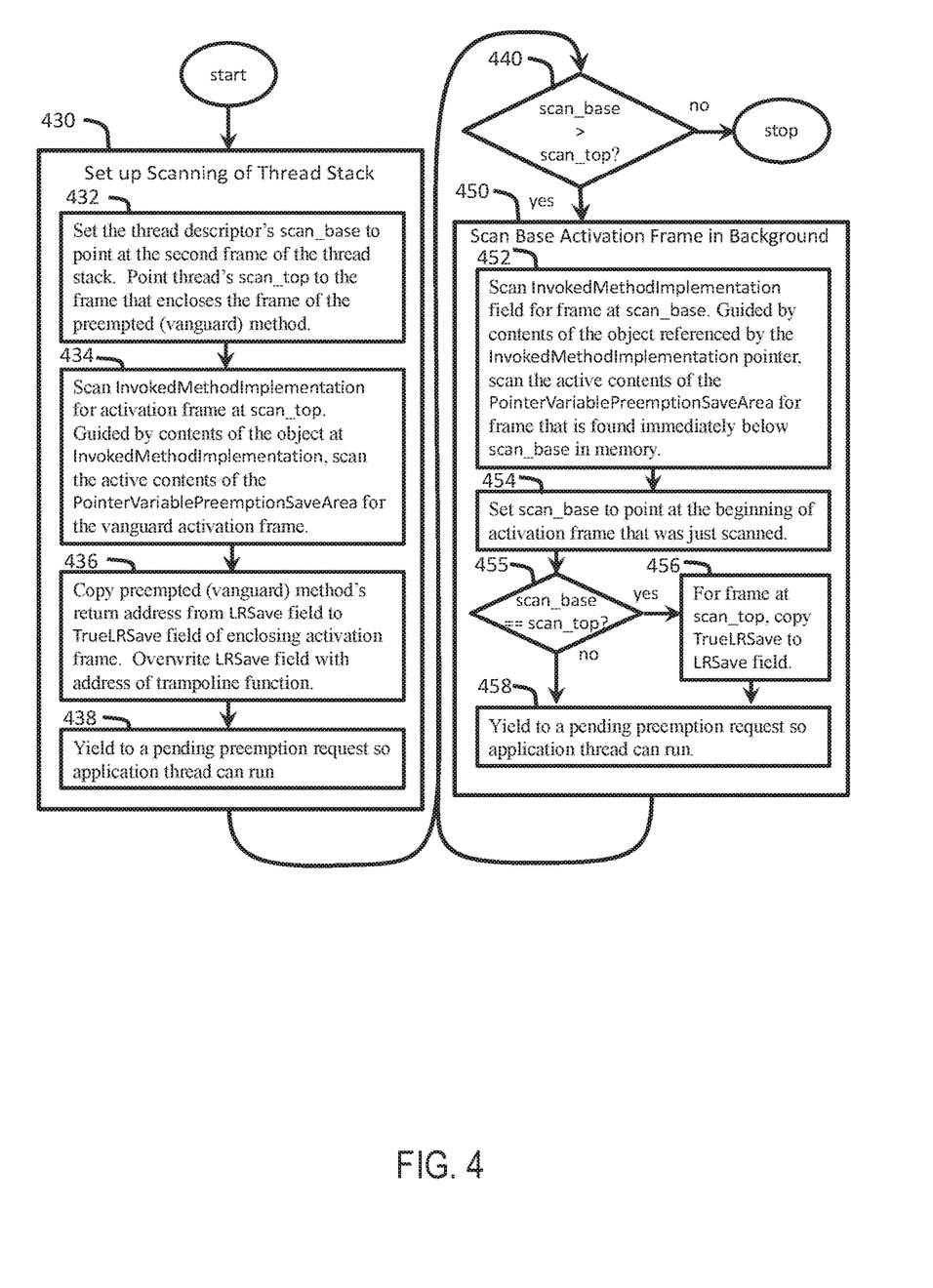
FIG. 4 illustrates a flowchart of an example method for performing background scanning of thread stack for a pause-less garbage collection.

FIG. 4 depicts a flowchart of an example method for performing a pause-less scan of a thread stack as a garbage collection activity that is running concurrently in the background of a time-critical application workload. Multiple instances of this method can run concurrently, one instance for each active thread in the process 112. The method includes a garbage collector 142 thread working in tandem with an associated application thread that is executing as part of the process 112. The garbage collector 142 thread scans the stack 114 of one process thread that is executing in the system 100 that the garbage collector 142 has signaled the intent to scan. Typically, the garbage collector 142 scans the thread stacks 114 starting from the bottom of each stack (higher memory addresses) and working towards its top. The thread stacks 114 are scanned as a background activity.

The garbage collector 142 determines that it is time to scan thread stacks because a previous phase of garbage collection has been completed, or because the size of the memory allocation pool has shrunk below a particular threshold value, or because a time previously scheduled to begin a certain garbage collection phase has been reached, or because of any other predetermined condition. For each of the threads whose stack needs to be scanned, the garbage collector 142 performs the method described in FIG. 4. The bottom-most activation frame on each thread stack is assumed to be associated with a simple bootstrap method that has no explicit preemption points and maintains no pointers other than the value of the InvokedMethodImplementation field of its activation frame.

At the moment the garbage collector selects a process thread to have its stack scanned, the garbage collector assures that the application thread is in a preempted state. The process thread method that was running when the thread was most recently preempted is identified as the vanguard method. When the process thread is selected for the corresponding program stack 114 to be scanned, the garbage collector 142 sets the associated thread descriptor's scan_base and scan_top fields to identify the range of pauseless activation frames than need to be scanned 432, it scans the pointer variable preemption save area 230 of the vanguard method 434, and it notifies the process thread of the process 112 to assist with scanning of its own stack frames by overwriting the return address of the vanguard method with the address of a special trampoline function 436. At the end of this setup work 430, the garbage collector 142 yields to allow the application thread to continue executing, if necessary. The time required to perform this setup work 430 is very small, typically less than 1 μs. Thus, the garbage collector's 142 interference on timely execution of application threads is characterized as pause-less.

FIG. 5 depicts a flowchart of an example method for scheduling alternating increments of effort between application processing and background garbage collection activities. During execution of the process 112, garbage collection is idle most of the time. A thread supervisor 148 which is part of the managed run-time environment 110 takes responsibility for scheduling increments of work to be performed by the garbage collector 142 and the process thread. If garbage collection is idle (460) or if the application thread has more urgent need to run than the garbage collector (462), increments of CPU time are dedicated to execution of a process thread (464). If the garbage collector's needs are more urgent than the process thread (462), increments of CPU time are dedicated to garbage collection activities (468). In the rare case that very high priority process 112 threads are waiting for heap to be replenished so that new objects can be allocated, garbage collection activities inherit the high scheduling priority of the waiting process threads. The most common scenario is that garbage collection runs at low priority and out-of-memory conditions are avoided by proactively performing garbage collection during times when the high-priority time-critical process threads are waiting for new work. Both process threads and garbage collection threads frequently yield to preemption requests (466, 470) so that any high-priority task that newly becomes ready to run can quickly gain access to the CPU 102 in order to complete its work in a timely manner.

As resources permit, a background garbage collection thread continues to scan the thread stack as a background activity, allowing higher priority process 112 threads to run in the foreground. In a loop that iterates while a thread has pause-less activation frames that need to be scanned as indicated by scan_base having a larger value than scan_top (440), the garbage collection thread scans the contents of the PointerVariablePreemptionSaveArea field belonging to the pause-less activation frame found immediately below the scan_base pointer (452). After scanning this activation frame, the garbage collector adjusts the value of the scan_base variable to reflect the new range of pause-less activation frames that still need to be scanned (454). If, after scanning one activation frame, there are no more activation frames to be scanned on this thread (455), the garbage collector overwrites the LRSave field for the caller of the thread's current vanguard method so that control will return to the vanguard method's original caller instead of to the trampoline subroutine when the vanguard method returns (456). The garbage collector 142 yields frequently to preemption requests so that higher priority process threads which become ready to run can quickly gain access to the CPU 102 in order to complete work in a timely manner (458).

When control returns from the vanguard method, special handling is provided. Rather than returning directly to the method that originally invoked the vanguard method, control returns instead to a special trampoline subroutine, which is represented by the flowchart illustrated in FIG. 6. The trampoline subroutine checks whether the caller's activation frame has been scanned already by the background garbage collection thread 480. If the caller's frame has not yet been scanned, the trampoline subroutine scans the activation frame 482 and adjusts the value of the thread descriptor's scan_top variable to identify the newly scanned activation frame as belonging to the newly selected vanguard method.

Figure 6:
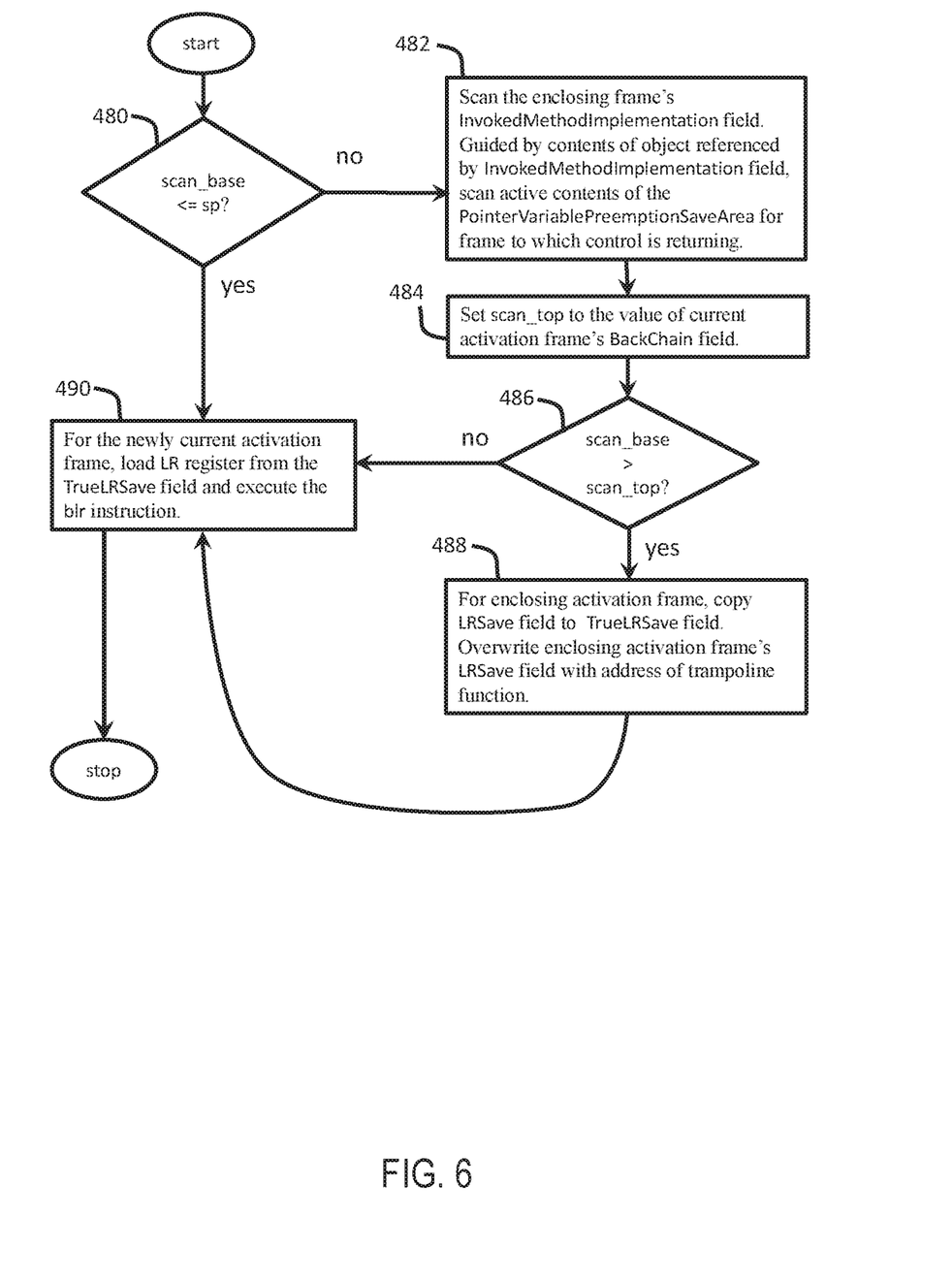
FIG. 6 illustrates a flowchart of an example method for scanning a caller's activation frame upon return from a vanguard method and identifying a new vanguard method.

In the case that the trampoline subroutine scans the newly selected vanguard method's activation frame, the trampoline subroutine further checks whether the activation frame of the newly selected vanguard method's caller also needs to be scanned 486. If so, the trampoline subroutine arranges for that activation frame to be scanned when control returns from the newly selected vanguard method by overwriting the LRSave and TrueLRSave fields of the caller's pause-less activation frame 488.

The final action performed by the trampoline subroutine is to return control to the caller of the previously running method by branching to the address held in the newly current activation frame's TrueLRSave field.

Figure 7:
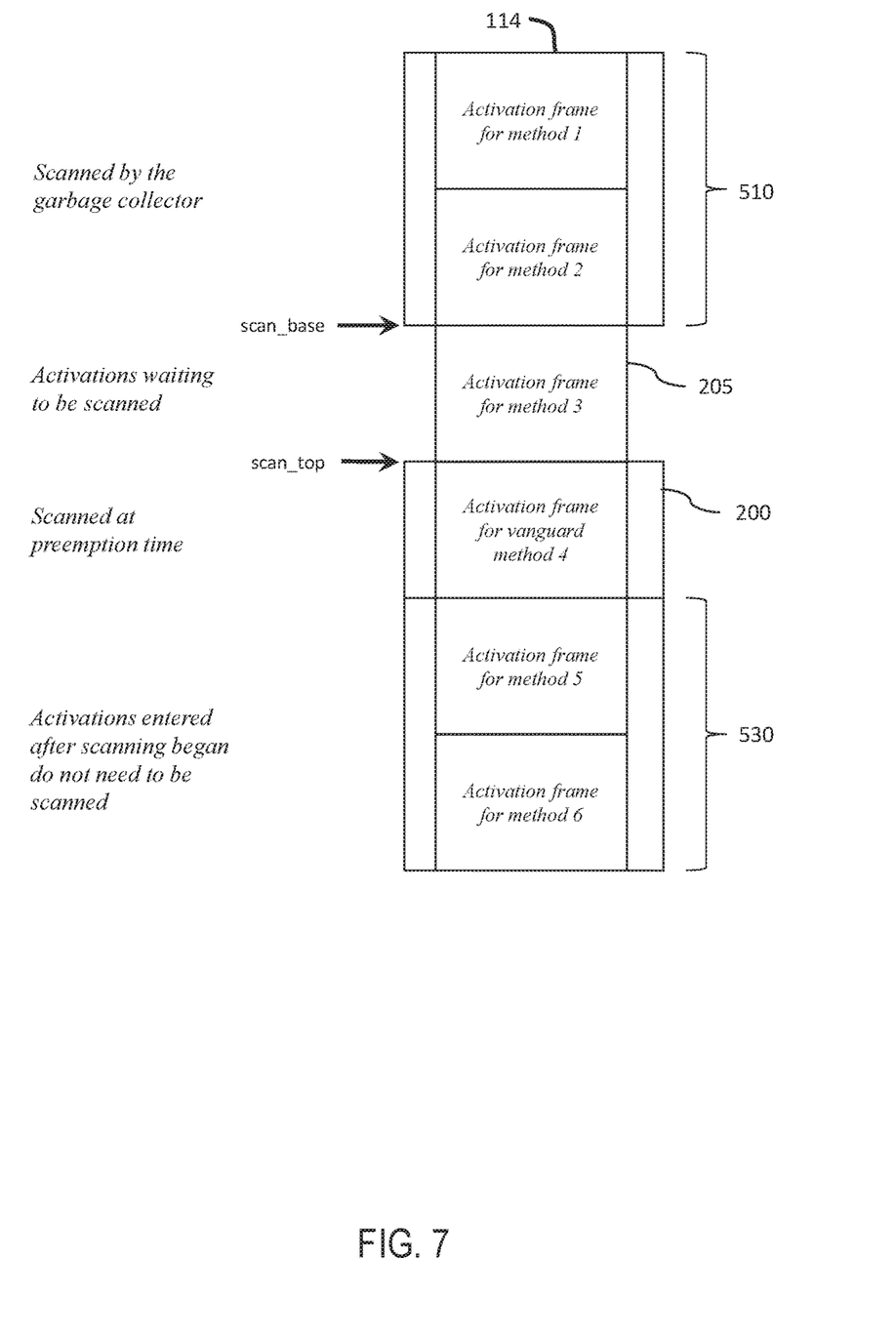
FIG. 7 illustrates a visual representation of an example scenario of the program stack scan being performed for garbage collection by the process thread.

The activation frames of methods invoked by the process thread after beginning the program stack 114 scanning are not scanned. FIG. 7 provides a visual representation of an example scenario of the program stack scan being performed for garbage collection by the process thread. The program stack 114 includes pause-less activation frames 510 that have been scanned by the garbage collector 142. The pause-less activation frames 510 are associated with methods that have called further methods and are waiting on the called methods to return from their execution. The further called methods include the vanguard method associated with the pause-less activation frame 200, the vanguard method being called by the caller method associated with the caller's pause-less activation frame 205. Further, the program stack 114 includes pause-less activation frames 530 corresponding to methods that are called by and after the vanguard method. The order in which the methods are called is represented by the order of the corresponding pause-less activation frames are pushed on the program stack 114.

In parallel, the garbage collector 142 scans the pause-less activation frames 510 of the one or more methods from the process thread it has signaled the intent to scan, at 450. For example, the scanning is performed as a background activity concurrently with the execution of the process thread.

Accordingly, the garbage collector 142 uses the process thread to perform an incremental stack scanning, where the process thread scans one or more pause-less activation frames substantially concurrent with the garbage collector 142 scanning other pause-less activation frames in the stack 114. As described herein, the stack 114 includes multiple pause-less activation frames, each frame corresponding to a respective method invocation from the computer program being executed by the computer system 100. In other words, each method invocation in the process 112 creates a corresponding pause-less activation frame 200 in the programming stack 114 of the thread that is executing the process 112. Each process thread has its own programming stack 114, in one or more examples. If a method, say method-3 (FIG. 7) calls another method, say method-4 (FIG. 5), the method-3 does not run until control returns from method-4. However, method-3's activation frame may still contain "live" pointers. Accordingly, the garbage collector 142 has to scan the pause-less activation frame 200 of method-4 (vanguard activation frame) and the pause-less activation frame 205 of method-3 (caller activation frame). The scanning is performed to identify the live pointers so that they can be processed by the garbage collection. The method-4 in turn can invoke/call other methods, such as method-5, which in turn calls method-6. The garbage collector 142 accordingly relocates live objects to contiguous locations so that unused objects found between the live objects can be coalesced into a single large free segment. This makes subsequent memory allocation operations much more efficient. Further, it should be noted that, in the above described scenario, when method-4 calls method-5 which calls method-6, method-4 is no longer the "present" method, because method-6 is the present method. Method-4 is still the vanguard method because it is the "forefront" method in the stack scanning. Other methods called from the vanguard method do not need to be scanned. Though the frame of the vanguard method has been scanned, the vanguard method is still involved in the scanning.

As described herein, the pause-less activation frames 530 corresponding to the method-5 and the method-6 are not to be scanned as they are initiated after the preemption point, which in this case was an invocation of the method-4. In this example, the garbage collector 142 starts scanning from the bottom of the stack 114, with the pause-less activation frame for the method-1 followed by the pause-less activation frame for the method-2 (510). Concurrently, the process thread takes responsibility for scanning any previously unscanned activation frame belonging to a method that is the caller of the vanguard method, when control returns from the vanguard method. In the case that the vanguard method returns before the garbage collector 142 scans the activation frame for method-3, the pause-less activation frame 205 for the method-3 is scanned by trampoline subroutine (FIG. 6) to which control flows when the vanguard method returns to the address represented in the LRSave field 220 of its caller's activation frame 482. Alternatively, the garbage collector may scan the activation frame 452 for method-3 before the process thread returns from the vanguard method. If the garbage collector 142 has already scanned the pause-less activation frame 205 for the method-3 by the time the process thread returns from the vanguard method, the process thread does not perform the scanning again. When this situation is discovered, the concurrent scanning of the pause-less activation frames is considered completed.

Scanning the pause-less activation frames by the garbage collector 142 includes finding, for each activation frame scanned, the currently live pointers. Referring back to FIG. 4, the garbage collector 142 finds the live pointers of the pause-less activation frame 200 by finding the Method-Implementation object that describes the current state of the activation frame's PointerVariablePreemptionSaveArea by fetching the value of the InvokedMethodImplementation field 210 from the caller's activation frame 205, at 434. The InvokedMethodImplementation field 210 in the pause-less activation frame 205 stores the address of the MethodImplementation object that describes the method that was most recently invoked by method-3. Further, the value of the LRSave field 220 of the vanguard method's pause-less activation frame 200 is used in combination with the information stored within the MethodImplementation object to determine which slots within the PointerVariablePreemptionSaveArea 230 hold live pointers for this particular preemption point, at 434.

The garbage collector's 142 scanning efforts (450) eventually meet up with the process thread's self-scanning efforts, at 455. If the garbage collector 142 identifies that all pause-less activation frames of the thread stack have been scanned, it overwrites that pause-less activation frame's LRSave 240 field with the current contents of its TrueLRSave field 220, at 455 and 456. At this point, the garbage collector 142 considers the process thread's stack 114 to have been completely scanned. Else, the garbage collector 142 continues to scan other pause-less activation frames 205 in the programming stack 114. In general, the garbage collector 142 cannot complete its current phase of operation until stacks 114 of all process threads have been completely scanned.

The technical solutions described herein facilitate a pause-less garbage collection in a computer programming language like Java. The pause-less garbage collection is facilitated by pause-less activation frames. A pause-less activation frame includes a fixed space at the top to hold local pointer values that are shared between the process thread and garbage collection threads, including a Method-Implementation object pointer. The process threads store and fetch the local pointer values at preemption-safe points that are established by a compiler. Each method invocation is treated as a preemption point. The process thread assists garbage collection by scanning the caller's activation frame upon return from the vanguard method of a particular process thread. The MethodImplementation object pointer provides stack trace information that can be embedded into an exception. The MethodImplementation object describes the state of the "Pointer Variable Preemption Save Area" at each preemption point.

The technical solutions described herein accordingly facilitate an improvement to garbage collection computer programming languages to implement high performance time-critical applications using pause-less garbage collection based on incremental stack scanning. By using the pause-less activation frames as described herein to perform pause-less garbage collection, the technical solutions described herein facilitate time-critical application thread performance substantially within 10% of traditional threads, and preemption latencies as low as 10 μs can be achieved.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions and actions specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for pause-less garbage collection, the method comprising:
    selecting, by a garbage collector, for garbage collection, a process thread that is executing a process;
    causing a first pause-less activation frame that is associated with a first method to be scanned, either by a garbage collector thread or by the process thread that is presently executing;
    instructing the process thread to subsequently scan a second pause-less activation frame that is associated with a second method from the process that the process thread is presently executing; and
    scanning, by the garbage collector, using the garbage collector thread, a third pause-less activation frame that is associated with a third method from the process, wherein:
        scanning a pause-less activation frame comprises examining and overwriting one or more live pointers from a method corresponding to said pause-less activation frame being scanned.

2. The method of claim 1, wherein the second method invokes the first method.

3. The method of claim 1, wherein the second pause-less activation frame is a plurality of pause-less activation frames.

4. The method of claim 1, wherein the third pause-less activation frame is a plurality of pause-less activation frames.

5. The method of claim 1, wherein the process thread scans the second pause-less activation frame substantially concurrently with the garbage collector thread scanning the third pause-less activation frame.

6. The method of claim 1, wherein the pause-less activation frame for the method includes an object pointer to an object that represents symbolic information associated with a fourth method that is invoked by the method corresponding to said pause-less activation frame being scanned.

7. The method of claim 1, wherein the pause-less activation frame for the method includes a pointer indicative of a return address to a method that invoked the method corresponding to said pause-less activation frame being scanned.

8. The method of claim 1, wherein the pause-less activation frame for the method includes a pointer-variable-preemption-save area that saves a value of each live pointer in the method corresponding to said pause-less activation frame being scanned.

9. A system comprising:
    a memory; and
    a processor coupled with the memory, the processor configured to perform a pause-less garbage collection that comprises:
        selecting, by a garbage collector, for garbage collection, a process thread that is executing a process;
        causing a first pause-less activation frame that is associated with a first method to be scanned, either by a garbage collector thread or by the process thread that is presently executing;

instructing the process thread to subsequently scan a second pause-less activation frame that is associated with a second method from the process that the process thread is presently executing; and scanning, by the garbage collector, using the garbage collector thread, a third pause-less activation frame that is associated with a third method from the process, wherein:

scanning a pause-less activation frame comprises examining and overwriting one or more live pointers from a method corresponding to said pause-less activation frame being scanned.

10. The system of claim 9, wherein the second method invokes the first method.

11. The system of claim 9, wherein the second pause-less activation frame is a plurality of pause-less activation frames.

12. The system of claim 9, wherein the third pause-less activation frame is a plurality of pause-less activation frames.

13. The system of claim 9, wherein the process thread scans the second pause-less activation frame substantially concurrently with the garbage collector thread scanning the third pause-less activation frame.

14. The system of claim 9, wherein the pause-less activation frame for the method includes an object pointer to an object that represents symbolic information associated with a fourth method that is invoked by the method corresponding to said pause-less activation frame being scanned.

15. The system of claim 9, wherein the pause-less activation frame for the method includes a pointer indicative of a return address to a method that invoked the method corresponding to said pause-less activation frame being scanned.

16. The system of claim 9, wherein the pause-less activation frame for the method includes a pointer to a pointer-variable-preemption-save area that saves a value of each live pointer in the method corresponding to said pause-less activation frame being scanned.

17. A computer program product comprising a computer readable storage medium having program instructions embodied therewith, the program instructions executable by an electronic computer processor to perform a pause-less garbage collection that comprises:

selecting, by a garbage collector, for garbage collection, a process thread that is executing a process;

causing a first pause-less activation frame that is associated with a first method to be scanned, either by a garbage collector thread or by the process thread that is presently executing;

instructing the process thread to subsequently scan a second pause-less activation frame that is associated with a second method from the process that the process thread is presently executing; and scanning, by the garbage collector, using the garbage collector thread, a third pause-less activation frame that is associated with a third method from the process, wherein:

scanning a pause-less activation frame comprises examining and overwriting one or more live pointers from a method corresponding to said pause-less activation frame being scanned.

18. The computer program product of claim 17, wherein the second method invokes the first method.

19. The computer program product of claim 17, wherein the pause-less activation frame for the method includes an object pointer to an object that represents symbolic information associated with a fourth method that is invoked by the method corresponding to said pause-less activation frame being scanned.

20. The computer program product of claim 17, wherein the pause-less activation frame for the method comprises:

a pointer indicative of a return address to a method that invoked the method corresponding to said pause-less activation frame being scanned; and a pointer-variable-preemption-save area that saves a value of each live pointer in the method corresponding to said pause-less activation frame being scanned.

* * * * *